INVENTOR.
Leo J. Nielsen

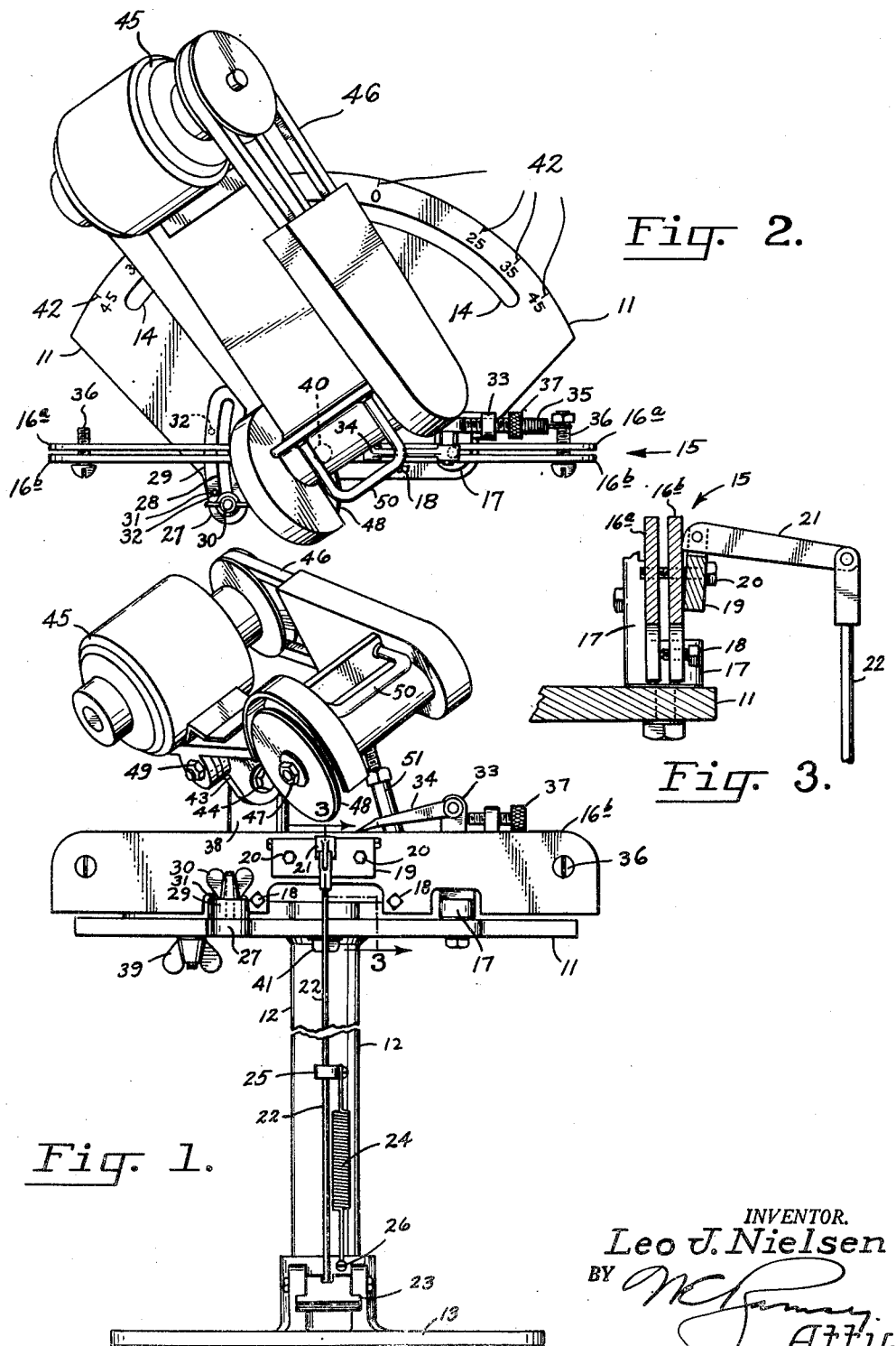

United States Patent Office 2,811,873
Patented Nov. 5, 1957

2,811,873

CHAIN SAW GRINDING MACHINE

Leo J. Nielsen, Myrtle Creek, Oreg.

Application October 6, 1954, Serial No. 460,700

5 Claims. (Cl. 76—40)

This invention relates to a sharpening machine having a power driven grinder for use in sharpening those chain saws which carry allochiral teeth of either the so-called chisel or the so-called chipper type. More particularly, it is an object of the invention to provide a sharpening machine having means for positioning the chain saw and grinder wheel relative to one another such that the cutting faces of both the left and right hand teeth of the saw will be sharpened, reconditioned, and ground to allochiral angles, thus producing a smoother, more efficient sawing operation with the sharpened saw.

Another object of my invention is to provide a mechanized, grinder wheel type chain saw sharpener with which the angularity and the positioning of the grinder wheel can be preset with the aid of reference or guide marks and lines in order to effect a precise and an accurate sharpening, regrinding and reconditioning of chain saws carrying either chipper or chisel type teeth such that both the left and the right hand teeth thereinafter will effect equal cutting and slicing action.

To the above ends, those familiar with chain saws will recognize that a vast majority of these saws carry allochiral teeth of either the chisel or the chipper type. The chisel or Hassler tooth is described in United States Patent 2,326,854 whereas the chipper or Oregon tooth is described in United States Patent 2,508,784. Chain saws equipped with either tooth type are articulated by virtue of links which join alternate allochiral teeth (teeth which are alike except differing as to right and left hand). Hand sharpening of these teeth conventionally is accomplished with a hand file, the chain being held on a vise-like holder and being turned end for end to shift from the right hand to the left hand teeth. Mechanical sharpening conventionally is accomplished either with a grinder burr as described in United States Patent 2,568,062 or with a grinder wheel as described in United States Patent 2,589,165, the wheel being more widely adopted since it can sharpen both tooth types whereas the burr is difficult to manipulate accurately in the sharpening of the square faced chisel tooth.

In spite of the higher initial investment cost, mechanical grinder wheels are preferred to files by large saw mill operators and by most independent saw sharpeners because they are faster and less expensive per production unit. For example, a hand file operation consumes about thirty minutes of time and the file itself will last about three chains—i. e. will sharpen about three chains before the file must be replaced. A grinder wheel sharpening, on the other hand, will consume only ten minutes of time and the wheel will last upwards of two hundred chains. Costwise, a wheel or burr is worn down perhaps two to three cents worth per chain whereas the file is worn down perhaps twenty-five cents worth per chain. It is for these reasons that the instant invention employs a grinder wheel in preference to either a burr or a file, one object of the invention being to provide the less costly grinder wheel type of mechanical sharpener while, at the same time, providing a mechanism which will sharpen either the rounded chipper tooth or the square faced chisel tooth.

Another important factor in chain saw sharpening arises from the fact that alternate ones of the teeth are right and left handed. This heretofore has required, in all sharpeners with which I am familiar, that the sharpening operation proceed in the following sequence: (1) The chain saw is clamped in the holder or vise and alternate ones of the teeth are sharpened. That is to say, all of the right hand teeth are sharpened, for example, and the left hand teeth are skipped over. (2) The chain saw then is turned end for end and the opposite teeth are sharpened. That is to say, if the right hand teeth were sharpened first, the left hand teeth then are sharpened. This requirement for turning the chain saw end for end at the halfway point in a sharpening operation gives use to another object of the instant invention to provide a mechanical sharpener which eliminates the necessity for turning the chain and, thereinafter, for resetting the chain holder mechanism thus is saving of time and cost in a sharpening operation.

When a chain saw is properly sharpened, the cutting faces of the right and left hand teeth define the same but opposite angles. By way of example, the cuting face on the vertical leg of a chisel or L-shaped tooth which is left handed may be inclined 35°, measured in the direction that a tooth progresses through the kerf, from a vertical plane. In similar manner, the right hand tooth has a cutting face on the vertical leg thereof which is inclined 35° from the same reference plane. With allochiral angles on the right and left handed teeth, the load and the pull on the chain saw and on the individual links is balanced and the saw is stabilized and smooth in operation. It thus results that a uniform kerf is cut and there is no tendency to gouge or tear the wood and there is no jerkiness in the operation.

To those skilled in chain saw operation, it is considered axiomatic that the angle at which the cutting face of the tooth is ground and sharpened is the prime factor in a good sharpening operation. With all those prior art sharpeners which require that the chain be turned end for end in switching from right to left handed tooth sharpening operations, however, this important requirement for allochiral angles has not been met with the necessary precision. This is for the reason that the removal and replacement of the chain disturbs the setup and requires that the sharpener be readjusted. In addition, previous mechanical chain saw sharpeners have required that the holder or support for the grinder wheel or burr be readjusted in angular position when the switch over is made from the sharpening of left to right handed teeth or vice versa. This switch over and adjustment is difficult to achieve with precision since the adjusting and positioning mechanism of the sharpener is manipulated by hand and little, if any, reference point, line, or plane is defined from which precise granding angles can be measured. As is apparent, it is the tooth itself and not the sharpener from which these grinding angles should be taken.

It is one object of the instant invention to provide a chain saw sharpener in which the chain itself is held in the same reference plane and the setup of the chain and teeth is not disturbed while both the left and right hand teeth are sharpened, thereby assuring greater accuracy in grinding allochiral angles into the allochiral cutting faces.

Yet another object of my invention is to provide a chain saw sharpener in which a power driven grinder wheel is carried at an oblique grinding angle upon a frame member which is mounted for pivotal adjustment back and forth in a horizontal plane about a vertical reference axis and across a median reference line. Thus, when it is desired to switch from sharpening the right hand teeth to sharpening the left hand teeth, the frame member and motor driven grinder wheel are pivoted as an integral fixed unit horizontally across the median reference line and through an angle which is the same angular distance to one side of the median reference line as the prior setting of the mechanism was to the opposite side. In this manner, the oblique angular disposition of the grinder wheel itself is maintained and is unchanged for both portions of the sharpening operation, the position of the chain saw itself is maintained, and only one angular adjustment is required, this angular adjustment being measured with respect to a median reference line easily visible to the operator whereby allochiral angles are achieved by the grinder wheel and are therefore ground into the cutting faces of the saw teeth.

Yet another object of my invention is to provide a chain saw sharpener in which but one swinging adjustment is required to shift from the sharpening of left to right handed teeth or vice versa, thereby assuring an accuracy of the sharpening operation which will produce the same relative angles on the cutting faces of the teeth in order that the chain saw will not pull or drag more to one side than to the other during a sawing operation.

These and other objects and advantages of my invention hereinafter will be set forth with reference to the accompanying drawings, in which:

Fig. 1 is a front elevation, partly foreshortened in height, of my chain saw sharpening machine;

Fig. 2 is a top plan view showing the horizontal table and the angular reference lines together with the power driven grinder wheel of the sharpener;

Fig. 3 is a partial detail, taken substantially on the line 3—3 of Fig. 1, showing the clamping plates which hold the chain saw during the sharpening operation;

Figure 4:
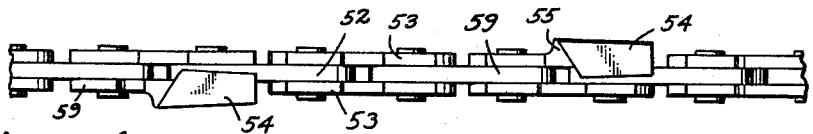
Figure 5:
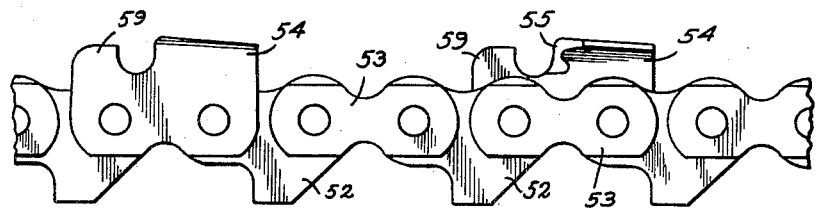
Figure 6:
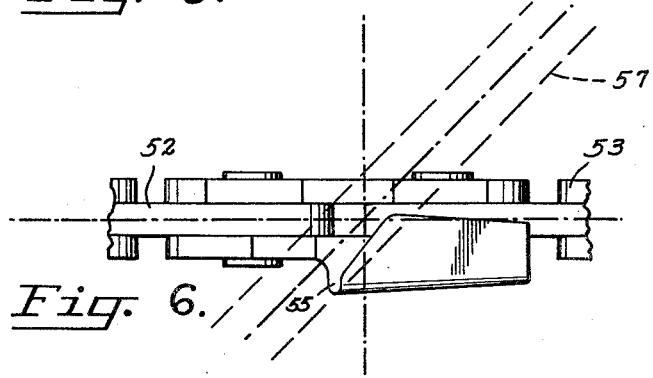
Figure 9:
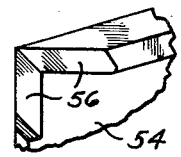
Figure 7:
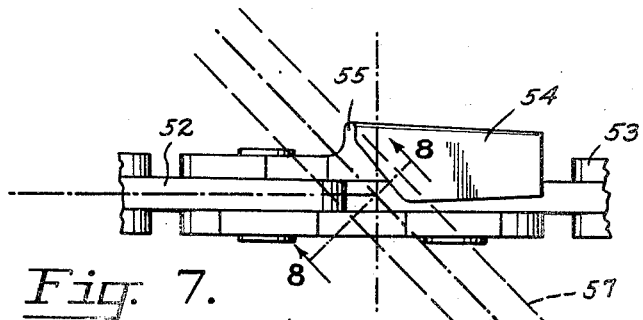
Figure 10:
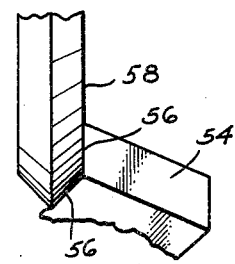

Figs. 4, 5, 6, 7 and 8 are various detail views of a chipper or Oregon type chain saw and tooth, Figs. 6 and 7 illustrating left and right handed teeth, respectively, and the latter three of these figures illustrating in dashed outline the relative position of the grinding wheel during a sharpening operation; and Figs. 9 and 10 are detail views of a right hand and a left hand chisel or Hassler type tooth, respectively, Fig. 10 showing the relative position of the grinder wheel with respect to the cutting faces of the left hand tooth during a sharpening operation.

In general orientation, Figs. 1 to 3 inclusive illustrate the chain saw sharpener and the various mechanical elements thereof whereas Figs. 4 to 10 inclusive illustrate the two basic types of chain saws and the two types of teeth now most commonly used in the United States and Canada. One practical advantage of the sharpening machine of my invention is that both types of teeth can be sharpened merely by effecting a minor adjustment and interchange of grinding wheels. The purchaser of the sharpener thus need not purchase two separate machines or, as heretofore has been the practice with some sawmills or independent saw sharpeners, need not sharpen one type tooth with a machine and the other by hand filing.

The largest structural element of the sharpener is a horizontal table 11 which is arcuate in outline and is mounted upon a vertical leg 12 set upon a base or stand 13. Where a bench or other work area is provided in a sawmill or sharpening shop, the stand 13 and vertical leg 12 may, of course, be eliminated and the horizontal table 11 may be mounted directly upon the bench. In either event, the table 11 is provided with an elongated arcuate slot 14 adjacent the rounded edge thereof and a clamping plate means 15 adjacent the opposite edge thereof. In essence, the clamping plate means 15 comprises a pair of vertically disposed elongated clamping plates 16a and 16b, the former of which is fixed to the table 11 by an adjustable pivot 17. The plate 16b, on the other hand, is carried by the plate 16a and is mounted for clamping movement toward and away therefrom by mechanism now to be described.

Referring particularly to Figs. 1 and 3, a pair of spacer screws 18 are carried by the movable plate 16b with the inner ends thereof bearing upon the fixed plate 16a. A shoe 19 overlies the movable plate 16b and is fixed loosely in place by means of two adjustment bolts 20 (see Fig. 3). A cam lever 21 pivotally is joined to the shoe 19 and to an actuation rod 22. The rod 22, in turn, is moved vertically in a direction parallel to the axis of the vertical support or leg 12 by means of a foot treadle 23. A constant but yieldable bias force is imparted downwardly to the actuation rod 22 by means of a tension spring 24 one end of which is joined to the rod, as in 25, and the other end of which is fixed to a portion of the base or stand 13 as at 26.

Depression of the treadle 23 raises the rod 22 against the force of the tension spring 24 and allows the movable plate 16b to move outwardly away from its companion plate 16a. Release of the foot treadle, on the other hand, allows the spring 24 to reset the treadle and to move the actuation rod 22 downwardly to its original position. This downward movement of the rod 22 pivots the cam lever 21 to cause both the end thereof and the lower marginal edge of the shoe 19 to press against the movable plate 16b and firmly to catch and fix the chain saw between these plates. I term this mechanism a vertical clamp means for holding a chain saw.

In Figs. 1 and 2, two other features associated with the vertical clamp means 15 will be described. The first of these is a mechanism which provides for the pivotal movement about a vertical axis of the clamp means itself. To this end, it will be noted that the bracket 17 is spaced slightly from the table 11 by means of a shim in order to provide for limited rotation between these two elements. Additionally, the table 11 is cast with an elongated arm 27 having an arcuate slot 28 therein. An apertured bracket 29 overlies the arm 27 with the aperture therein mated to the slot 28 and with the bracket itself fixed to the plate 16a. A wing nut and bolt assembly 30 are carried in the aperture of the bracket 29 and through the slot 28 adjustably to fix these two elements against movement relative to one another. Where desired, an additional adjustment element may be provided in the form of a positioning pin 31 having a frictional or force fit with a hole in the bracket 29 and, selectively, with one of three mated holes 32 carried by the arm 27.

In use, the above described mechanism provides for a pivotal movement about a vertical axis of the clamping means 15 for purposes later to be described. Thus, the position of the clamping plate mechanism which is illustrated in Fig. 2 is a central position and adjustment of both plates as a unit is provided to either side of the central position about a vertical axis defined by the bracket 17. To effect a pivotal swing or adjustment, the wing nut 30 is backed off, the positioning pin 31 removed from its companion hole, and the plates are swung as a unit to the desired position. Thereinafter, the positioning pin 31 is reinserted in a new hole to define a precise and an exact angular relationship of the parts, and the wing nut 30 once more is tightened. In sharpening the Oregon or chipper type chain saw tooth, the clamping mechanism is fixed in the central position of Fig. 2. On the other hand, when the chisel or Hassler type tooth is sharpened, the clamping mechanism is swung inwardly of the table for the right hand teeth and outwardly thereof for the left hand teeth all as hereinafter will be described with relation to the operation of the mechanism.

The second element associated with the clamping means 15 and yet to be described is an indexing arm for the precise positioning of an individual saw tooth longitudinally of the clamping plates 16a and 16b. As shown in Figs. 1 and 2, this means includes a support 33 which slidably is carried by the innermost plate 16a for movement in a direction longitudinally thereof. This slidable support 33 journals an arm 34 having a wedge-shaped surface on one end thereof designed to contact the back or rear face of a tooth to define a reference position for the sharpening operation. Arm 34 resembles a bell crank lever and the opposite end thereof is secured to a tension spring 35 thereby biasing the wedge-shaped end of the arm downwardly toward contact with the plates 16a and 16b. The opposite end of the tension spring 35 is secured to the clamping means 15 by a nut and bolt type fastening 36. Adjustment of the support 33 and arm 34 longitudinally of the major axis of the plates 16a and 16b is accomplished by means of a knurled indexing screw 37 which bears upon a portion of the support 33 in the manner illustrated in Figs. 1 and 2. Thus, movement of the support 33 and arm 34 in one direction is accomplished by turning the knurled index screw inwardly and movement in the opposite direction by turning the indexing screw in the opposite direction. The tension spring 35 yieldably holds the support arm 33 in contact with the end of the knurled indexing screw 37 during both such movements. This spring allows the wedge-shaped end of the arm 34 to ride up and over the top of a tooth during an indexing operation.

Referring now to the details of the power driven grinder mechanism, a vertical frame member 38 (see Fig. 1) is mounted for sliding adjustment back and forth across the table 11. In cooperation therewith, a wing nut and bolt assembly 39 underlies the table and detachably or adjustably fixes the frame member 38 to the table 11. Such an assembly accommodates pivotal adjustment of the frame member back and forth across the table when the wing nut is loosened. Thus, the toe of the frame member 38 pivotally is fixed to a central portion of the table 11, as by the nut and bolt 41 which mate with the other aperture in the toe of the frame. In this manner, the nut and bolt 41 and the end of the toe of the frame define a vertical reference axis which is indicated by a circular dashed line 40 in Fig. 2. It is this axis about which the entire grinder swings when an adjustment is effected. Furthermore, in cooperation therewith, reference lines 42 are scribed on the surface of the table 11 as shown in Fig. 2. Thus, for example, one reference line 42 may be scribed at a zero or central angular position, another reference line 42 at a position indicating a swing of 25° therefrom, and yet another at a point indicating a swing of 35° and/or 45° therefrom. Each of these reference lines 42 is generated from the vertical reference axis defined by the nut and bolt 40, 41 and each extends radially toward the elongated slot 14 in full view of the operator of the machine. The function of these reference lines will be explained hereinafter with respect to the operation of the chain saw sharpener.

In Fig. 1, the vertical frame member 38 carries a support arm 43. This support arm is mounted pivotally by means of the previously mentioned horizontal aperture at the top of the frame member 38 and by means of a bolt 44. The bolt 44 is arranged in a horizontal position accommodating pivotal adjustment of the support arm 43 about a horizontal axis. It is at this point that one important feature of my invention becomes evident. Thus, the horizontal axis which is defined by the bolt 44 intersects the aforementioned vertical reference axis defined by the bolts 41, 40. Additionally, the point of intersection of these axes is arranged to coincide with the exact location of a saw tooth which is positioned for sharpening by the clamping means 15 and indexer 34. By thus fixing the angular relationship of the elements, I am enabled to adjust the right or left hand disposition of the sharpener with respect to the cutting faces of the saw tooth without disturbing either the oblique angularity of the grinder wheel or the position of the saw in the clamps 16. That is to say, by causing the vertical reference axis 40, 41 and the horizontal reference axis 44 to intersect at the location of a saw tooth which is being sharpened, I am enabled to swing the sharpener for adjustment from right hand to left hand teeth without disturbing the setup of the saw itself as will become apparent when the operation of the saw sharpener is explained.

It is the power driven grinder wheel itself which is carried by the support arm 43. To this end, an electric motor 45 operatively is joined to a belt and pulley system 46 in order to rotate a grinder wheel 48 which is mounted upon a nut secured axle 47. Electrical actuation of the motor 45 causes the grinder wheel 48 to rotate at that high rate of speed which is essential to a sharpening operation. Such rotation is effected by the interconnection of the belt and pulley system 46. Additionally, the support arm 43 and power driven grinder wheel are joined, one to another, by means of a pivot adjustment mechanism 49. This pivot adjustment is arranged and positioned with the electric motor 45 to one side of the axis thereof and with the grinder wheel 48 and a handle 50 to the other side thereof. Thus, a balanced construction is allowed and movement of the grinder wheel 48 toward and away from the clamping means 15 easily is effected by pivoting the mechanism about the adjustment 49, by use of the handle 50. As will be evident from an inspection of Figs. 1 and 2, the entire motor and grinder wheel mechanism has been tilted to one side at an oblique angle by virtue of the adjustment provided by the bolt 44. This results in an oblique disposition of the periphery of the grinder wheel 48 and allows an oblique angle to be ground into the cutting faces of a tooth as hereinafter will be described.

The remaining undescribed element in Fig. 1 comprise an adjustable stop mechanism 51 which protrudes above the table 11 to limit downward movement of the sharpener by abutment with the power driven grinder wheel mechanism. To this end, the adjustable stop 51 is fixed at its lower end to the table 11 and is positioned, at its upper end, immediately under but spaced from the frame and support structure for the grinder wheel 48. Upward adjustment of the grinder wheel about the pivotal adjustment mechanism 49 is limited by contact of the support elements themselves and downward adjustment toward the plates 16 and the chain saw is limited at a preselected position by the adjustable stop mechanism 51.

In Figs. 4 to 8 inclusive, I have illustrated a chain saw and an individual tooth of the Oregon or chipper type described in United States Patent 2,508,784. In Figs. 9 and 10, on the other hand, I have illustrated a tooth of the chisel or Hassler type as disclosed in United States Patent 2,326,854. The main difference between these teeth is in the angularity or arrangement of the cutting faces. Thus, each chain saw consists of a number of links 52 having depending sprocket engaging roots thereon. These links are joined by side plates 53 having pivotal connection therewith. Alternate pairs of these side plates 53 carry cutting teeth 54 having depth gauges 59. In Figs. 4 to 8 inclusive the cutting teeth 54 have rounded cutting faces 55 of the aforementioned Oregon or chipper type. In Figs. 9 and 10, the cutting teeth 54 are provided with L-shaped or angular cutting faces 56 of the chisel or Hassler type. These two types of teeth are basic and are well-known in the chain saw art. A majority of all chain saws presently manufactured conform to one or the other of these two types.

Figure 8:
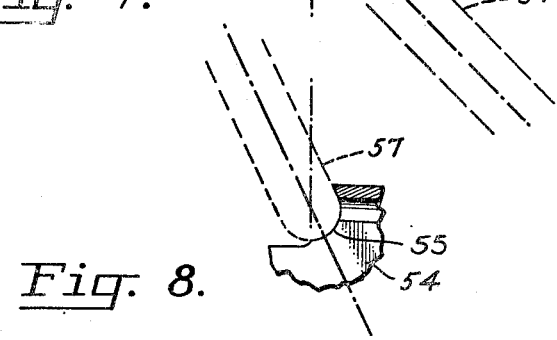

In sharpening the chipper or rounded tooth of Figs. 4 to 8, I utilize a grinder wheel 48 having a rounded peripheral surface thereon as indicated at 57 in dashed lines in Fig. 8. In sharpening the chisel or Hassler type tooth, a grinder wheel 48 is employed having a flat plane side and an angular profile peripheral portion. The angularly disposed surfaces of the periphery of the guide wheel are arranged at an angle one to another in accord with the relative angularity of the cutting faces as shown at 58 in Fig. 10. Interchange of these two grinder wheels is accommodated by the nut and bolt mounting thereof illustrated at 47 in Fig. 1. Thus, to change from the rounded grinder wheel 57 to the angular grinder wheel 58, the nut indicated at 47 is backed off, the first wheel is removed, the second wheel is inserted over the axle, and the nut 47 once more is tightened in place.

Operation

To sharpen a chain saw with the above described mechanism, the chain portion of the saw first is removed and disassembled from the housing, framework, and associated engine. Thereafter, with the teeth in a vertical position such as is illustrated in Fig. 5, the foot treadle 23 is depressed to space the clamping plates 16 and a section of the chain is inserted between the plates with the teeth projecting above the top surfaces thereof. Thereinafter, the foot treadle 23 is released allowing the tension spring 24 to move the rod 22 downwardly and clamp the saw tightly in position by the coaction of the cam lever 21 and shoe 19 against the clamping means 15. Assuming it is an Oregon or chipper tooth which is to be sharpened, all of the left hand teeth first will be sharpened after which all of the right hand teeth will be sharpened. Initially, the foot treadle 23 is depressed slightly and the chain is caused to slide along the upper surfaces of the clamping plates 16a and 16b and under the indexing arm 34. After the first tooth passes under the arm 34, the chain is backed up slightly until the wedge shaped terminal end of the arm contacts the back or rear face of the tooth. This defines a precise and an exact reference position. Each time a new or a different type or make of chain is to be sharpened, of course, it may be necessary to effect an initial adjustment of the indexing device by rotating the knurled indexing screw 37. Once such an adjustment is effected for the first tooth of a particular chain, however, no further adjustment is required during the sharpening of that particular chain.

With the chain in proper position, the operator then must determine his preference of cutting face angles and must set the machine accordingly. This setting or adjustment is accomplished by referring to the reference lines 42 which are scribed upon the top surface of the table 11. For example, pivotal adjustment of the vertical frame member 38 about the vertical reference axis defined by the nut 41, 40 is effected by backing off the wing nut assembly 39. Thereinafter, the frame member 38, support arm 43, electric motor 45, and grinder wheel 48 all can be moved as a unit a preselected angular distance to one side or the other of the median reference line defined at zero in Fig. 2. In sharpening a right hand tooth with a 35° face angle, for example, the position of the elements will be substantially as shown in Fig. 2 of the drawings with the frame member 38 and associated mechanism exactly 35° to the left of the median reference line.

With the angular position of the sharpener adjusted, the wing nut assembly 39 is tightened and any desired angular adjustment of the support arm 43 about the horizontal axis defined by the bolt 44 is effected. In actual practice, the bolt 44 seldom is disturbed for the oblique angular disposition of the grinder wheel is a constant for many chain saw teeth. Individual operators, however, may desire to effect various sharpening and consequent cutting face angles in the teeth and it is for this reason that I provide for a ready and a quick adjustment with the bolt 44. Additionally, it should be noted at this point that the chipper or Oregon tooth is sharpened with the clamping means 15 arranged in the central position illustrated in Fig. 2. Thus, with the chain saw in place, the handle 50 is grasped and the power driven grinder wheel is moved downwardly into contact with the faces of the tooth 54. The stop 51 then is set, the grinder backed off, the power turned on, and the grinder moved against the tooth. The grinder wheel 48 then sharpens the tooth to the depth permitted by the adjustable stop 51 and the next tooth is indexed forward.

In Figs. 6, 7 and 8, the peripheral outline of the grinder wheel 48 is shown in dashed lines at 57. It is assumed that a right hand tooth is being sharpened, Figs. 7 and 8 both being pertinent. Thus, the outline of the grinder wheel 57 is related to the cutting faces 55 of the tooth as shown therein. It will be noted that Fig. 8 is taken at right angles to the plane of the grinder wheel as shown by the arrowed direction lines in Fig. 7. Thus, the rounded periphery of the grinder wheel 57 fits within the rounded contour of the cutting faces 55 to sharpen this type of a tooth. It is important to note in this connection that the vertical reference axis defined by the bolt 41, the horizontal reference axis defined by the bolt 44 and the periphery of the wheel all meet at a point which coincides with the cutting faces of the tooth.

After the first right hand tooth has been sharpened, the foot treadle 23 is depressed and the indexing mechanism is utilized to position the next succeeding right hand tooth exactly under the grinder wheel with the cutting faces thereof directly above the vertical axis defined by the nut and bolt 40, 41. After all right hand teeth have been sharpened, the saw is indexed one tooth to bring a left handed tooth into position beneath the grinder wheel and in interception of the vertical reference axis. Thereafter, the wing nut assembly 39 is backed off and the entire frame member, support arm and power driven grinder wheel assembly are swung about the vertical reference axis to a new angular disposition. This angular disposition is allochiral to the first position and the angle itself is equal but opposite to the angle utilized for a right handed tooth. Thus, in the 35° exemplary angle under discussion, the entire grinder wheel mechanism will be swung 70° over to the 35° scribe or reference line indicated at 42 to the right side of Fig. 2. Thereinafter, the wing nut assembly 39 once more is tightened and the sharpener is ready for operation.

In effecting the above swing of the grinder from a left to a right hand allochiral position, it will be noted that the chain saw itself need not be disturbed or turned end for end as heretofore has been the requirement with chain saw sharpeners of both the manual and the mechanical type. Additionally, the pivotal adjustments afforded by the horizontal reference bolt 44 and the pivot adjustment mechanism 49 need not be disturbed since the interception of the vertical and horizontal reference axes together with the relative position of the periphery of the grinder wheel 48 has been maintained. This simple swinging adjustment from right hand to left hand teeth or vice versa can be accomplished with an accuracy which heretofore has been lacking with mechanical type chain saw sharpeners. This increased accuracy assures that the same relative angles are ground into the cutting faces of the left and right handed teeth. To the chain saw operator or sawyer, this is of particular importance since a chain with allochiral cutting faces will not pull, bind, dig, or chatter during operation. Yet further, this simple adjustment of the sharpener mechanism itself allows a relatively inexperienced operator to sharpen a chain saw after a more experienced operator or lead man has set the initial angles.

In sharpening the chisel or Hassler type tooth disclosed in Figs. 9 and 10, the angular or square-faced grinder wheel shown at 58 in Fig. 10 is employed. Thus, the rounded profile grinder wheel is removed and the ridged profile grinder wheel substituted therefor by manipulation of the nut and bolt assembly of the axle indicated at 47 of Fig. 1. Thereinafter, the frame member 38, support arm 43, and associated motor and grinder wheel mechanism are swung about to the central median line defined by the zero reference mark 42 in Fig. 2. With a right-handed tooth, the wing nut assembly 30 then is loosened and the clamping plate mechanism 16 is swung to the right (inwardly) and precisely positioned at an exemplary 35° angle by employing the positioning pin 31 and mated hole 32 as shown in Figs. 1 and 2. Thereinafter, the foot treadle 23 is depressed and the chain is moved through the plates in cooperation with the indexing device in the same manner as with the chipper type tooth.

After all of the right hand chisel or Hassler type teeth have been sharpened, the wing nut assembly 30 once more is backed off, the positioning pin 31 is removed, and the clamping mechanism 15 is swung outwardly to an allochiral angle. This angle is measured with reference to the central position of Fig. 2 and it is exactly equal in degrees to the angle which was utilized with the right-hand tooth. Thus, in sharpening the chisel or Hassler type tooth, the frame member, support arm, and power driven grinder wheel all are maintained in a fixed position while the clamping means 15 is moved from a position of preselected angular displacement to one side of the central position to a position of equal angular displacement to the opposite side of the said central position. This swinging of the clamping means shifts the chain saw itself to present allochiral cutting face angles to the grinder wheel. Such a shift from a sharpening of left hand to right hand teeth or vice versa thus is effected with a simplicity heretofore lacking and it results in the same benefits mentioned with reference to the other tooth type. In the above description of my chain saw sharpening machine and in the claims which follow, I have utilized the terms "horizontal" and "vertical" as they are related to the position of the machine illustrated in the drawings. It will be evident, of course, that these terms are intended to have a broader definition than their dictionary definition since horizontal and vertical here are relative terms. Thus, some operators may mount my machine upon an inclined or a vertical bench or wall whereupon the reference axis described as "horizontal" actually would be oblique or "vertical." The important feature is that these axes are normal relative to one another and I thus intend the terms employed to cover the structure disclosed and claimed rather than any particular mounting thereof.

In summary, it will be seen that I have provided a chain saw sharpener which positions the chain and the grinder relative to one another such that the cutting faces of both the left and the right hand teeth will be sharpened at allochiral angles, thus producing a smoother, more efficient sawing operation with the sharpened saw. Additionally, this required swinging adjustment of the sharpening mechanism can be effected with a precision and with an accuracy heretofore lacking in chain saw sharpeners. Still further, the machine is useful with either tooth type and an entire sharpening operation can proceed without the necessity of removing the saw from the clamping plates and turning it end for end as heretofore has been required.

I claim:

1. A chain saw sharpener, comprising a horizontal table having a clamping plate means mounted adjacent one edge thereof, said clamping means being mounted for pivotal movement about a vertical axis back and forth to either side of a central position, a frame member means mounted upon said table for pivotal adjustment back and forth in a horizontal plane about a vertical reference axis which intersects said clamping means in the central position thereof, a support arm means mounted upon said frame member for pivotal adjustment about a horizontal axis which intersects said vertical reference axis, releasable means for fixing said support arm in a preselected position of adjustment, an elongated power driven grinder wheel means carried by said support arm for movement toward and away from said clamping means about a support arm pivot axis, said grinder wheel means including a drive motor located to one side of said support arm pivot axis and a driven grinder wheel and guide handle located to the opposite side of the support arm pivot axis, said grinder wheel having a plane side and a lateral plane peripheral portion arranged at an angle one to another in accord with the relative angularity of the cutting faces on a chisel type chain saw tooth.

2. A mechanical sharpener for saws having left and right hand teeth, comprising a horizontal table having clamping means mounted for pivotal movement about a vertical axis back and forth to either side of a central position, distant means joined to said clamping means selectively to operate the latter between a grip and a release position, frame means mounted upon said table for pivotal adjustment back and forth in a horizontal plane about a vertical reference axis which intersects said clamping means in the central position thereof, support means mounted upon said frame member for pivotal adjustment about a horizontal axis which intersects said vertical reference axis, elongated grinder means carried by said support arm for movement toward and away from said clamping means, said latter means including a drive motor located adjacent one end of said elongated grinder means and operatively joined to a grinder wheel which is located adjacent the opposite end thereof, adjustable stop means projecting above said table in position for contact by said grinder means to terminate the movement thereof toward said clamping means when the periphery of the grinder wheel is a preselected distance from the clamping means, said clamping means being movable from a position of preselected angular displacement to one side of said central position to a position of equal angular displacement to the opposite side of said central position to shift from the sharpening of left hand teeth to the sharpening of right hand teeth without disturbing or resetting the remainder of the sharpener elements.

3. A chain saw sharpener, comprising a horizontal table having a vertically disposed elongated clamping plate means mounted adjacent one edge thereof, adjustable indexing means carried upon said clamping means for the precise positioning of a saw tooth longitudinally of the clamp means, a frame member means mounted upon said table for pivotal adjustment back and forth in a horizontal plane about a vertical reference axis which intersects said clamping means, said table having a visible horizontal line means which extends from adjacent said vertical axis in a direction normal to said vertically disposed clamping plate to define a median reference line from which cutting angles are calculated, a support arm means mounted upon said frame member for pivotal adjustment about a horizontal axis which intersects said vertical reference axis, a power driven grinder wheel means carried by said support arm for movement toward and away from said clamping means, said frame member, support arm and power driven grinder wheel being movable as a unit from a position of preselected angular displacement to one side of said median reference line to a position of equal angular displacement to the opposite side of said median reference line thereby swinging said grinder wheel to an allochiral position correlated to the original position as the left and right hand teeth of a chain saw.

4. A mechanical sharpener for saws having left and right hand teeth, comprising a horizontal table having a vertically disposed elongated clamping plate means mounted adjacent one edge thereof, spring biased and foot operated cam means joined to said clamping means selectively to operate the latter between a grip and a release position, adjustable and spring biased indexing means carried upon said clamping means for the precise positioning of a saw tooth longitudinally of the clamp means, a frame member means mounted upon said table for pivotal adjustment back and forth in a horizontal plane about a vertical reference axis which intersects said clamping means, said table having a horizontal line means which extends from adjacent said vertical axis in a direction normal to said vertically disposed clamping plate to define a median reference line, a support arm means mounted upon said frame member for pivotal adjustment about a horizontal axis which intersects said vertical reference axis, releasable means for fixing said support arm in a preselected position of adjustment, a power driven grinder wheel means carried by said support arm for movement toward and away from said clamping means, adjustable stop means projecting above said table in position for contact by said power driven grinder wheel means to terminate the movement thereof toward said clamping means when the periphery of the grinder wheel is a preselected distance from the clamping means, said frame member, support arm and power driven grinder wheel being movable as an integral fixed unit from a position of preselected angular displacement to one side of said median reference line to a position of equal angular displacement to the opposite side of said median reference line thereby swinging said grinder wheel to an allochiral position correlated to the original position as the left and right hand teeth of a chain saw.

5. A chain saw sharpener capable of grinding either a chisel or a chipper type tooth, comprising a horizontal table having a clamping plate means mounted adjacent one edge thereof, said clamping means being mounted for pivotal movement about a vertical axis back and forth to either side of a central position, a frame member means mounted upon said table for pivotal adjustment back and forth in a horizontal plane about a vertical reference axis which intersects said clamping means in the central position thereof, said table having a horizontal line means which extends from adjacent said vertical reference axis in a direction normal to said vertically disposed clamping plate in the central position thereof to define a median reference line from which cutting angles for a chipper type tooth are calculated, a support arm means mounted upon said frame member for pivotal adjustment about a horizontal axis which intersects said vertical reference axis, a power driven grinder wheel means carried by said support arm for movement about a pivot axis toward and away from said clamping means, said grinder wheel means including a drive motor located to one side of said pivot axis and a driven grinder wheel and guide handle located to the opposite side of said pivot axis, said frame member, support arm and power driven grinder wheel being movable as a fixed unit from a position of preselected angular displacement to one side of said median reference line to a position of equal angular displacement to the opposite side of said median reference line thereby swinging said grinder wheel to an allochiral position correlated to the original position as the left and right hand chipper type teeth of a chain saw, said clamping means being movable from a position of preselected angular displacement to one side of said central position to a position of equal angular displacement to the opposite side of said central position to shift from the sharpening of left hand chisel type teeth to the sharpening of right hand chisel type teeth.

References Cited in the file of this patent
UNITED STATES PATENTS

| | | |
|---|---|---|
| 106,431 | Tucker | Aug. 16, 1870 |
| 142,173 | Olney | Aug. 26, 1873 |
| 145,643 | Gibbs | Dec. 16, 1873 |
| 175,594 | Densmore | Apr. 4, 1876 |
| 261,624 | Olney | July 25, 1882 |
| 327,294 | McFadden | Sept. 29, 1885 |
| 1,551,230 | Armstrong | Aug. 25, 1925 |
| 2,470,290 | Chryst | May 17, 1949 |
| 2,519,748 | Duquette | Aug. 22, 1950 |
| 2,666,346 | Brown | Jan. 19, 1954 |